(12) United States Patent  
Tang

(10) Patent No.: US 9,182,293 B2  
(45) Date of Patent: Nov. 10, 2015

(54) POWER DEVICE TEMPERATURE MONITOR

(71) Applicant: Atieva, Inc., Redwood City, CA (US)

(72) Inventor: Yifan Tang, Redwood City, CA (US)

(73) Assignee: ATIEVA, Inc., Menlo Park, CA (US)

( * ) Notice: Subject to any disclaimer, the term of this patent is extended or adjusted under 35 U.S.C. 154(b) by 312 days.

(21) Appl. No.: 13/841,754

(22) Filed: Mar. 15, 2013

(65) Prior Publication Data

US 2014/0269831 A1     Sep. 18, 2014

(51) Int. Cl.
| | |
|---|---|
| *G01K 7/01* | (2006.01) |
| *G01F 1/68* | (2006.01) |
| *G01K 7/00* | (2006.01) |
| *G01K 7/34* | (2006.01) |

(52) U.S. Cl.  
CPC ........ *G01K 7/00* (2013.01); *G01K 7/346* (2013.01); *G01K 2217/00* (2013.01)

(58) Field of Classification Search  
None  
See application file for complete search history.

(56) References Cited

U.S. PATENT DOCUMENTS

| | | | | |
|---|---|---|---|---|
| 3,443,236 | A * | 5/1969 | Manfred et al. ............. | 330/250 |
| 4,198,676 | A | 4/1980 | Varnum et al. | |
| 5,063,342 | A * | 11/1991 | Hughes et al. .............. | 323/315 |
| 5,237,481 | A | 8/1993 | Soo et al. | |
| 5,451,806 | A * | 9/1995 | Davies ........................ | 257/370 |
| 5,828,263 | A * | 10/1998 | Gantioler et al. ............ | 327/512 |
| 6,092,927 | A * | 7/2000 | Clemente ..................... | 374/163 |
| 6,504,697 | B1 * | 1/2003 | Hille ............................ | 361/103 |
| 6,906,399 | B2 * | 6/2005 | Fruth et al. ................... | 257/577 |
| 7,274,576 | B1 | 9/2007 | Zargari et al. | |
| 7,327,129 | B2 * | 2/2008 | Chen et al. ................... | 323/285 |
| 7,835,129 | B2 * | 11/2010 | Thiele .......................... | 361/103 |
| 8,602,645 | B2 * | 12/2013 | Miyamoto et al. ........... | 374/178 |
| 8,947,157 | B2 * | 2/2015 | Levesque et al. ............. | 327/536 |
| 8,983,410 | B2 * | 3/2015 | Southcombe et al. ...... | 455/127.1 |
| 9,025,454 | B2 * | 5/2015 | Cedrone et al. .............. | 370/235 |

FOREIGN PATENT DOCUMENTS

| | | |
|---|---|---|
| JP | 05231291 | 9/1993 |
| JP | 08009567 | 1/1996 |

OTHER PUBLICATIONS

International Search Report, PCT/US2014/025521, mailed Jul. 10, 2014.

* cited by examiner

*Primary Examiner* — Peter Macchiarolo  
*Assistant Examiner* — Jermaine Jenkins  
(74) *Attorney, Agent, or Firm* — Womble Carlyle Sandridge & Rice, LLP

(57) ABSTRACT

A power device temperature monitor is provided. The power device temperature monitor includes a power device having a control terminal and an output terminal, where the output terminal is configured to output a current as directed by a voltage of the control terminal. The power device temperature monitor includes an inductor coupled to the output terminal of the power device and an amplifier coupled to the inductor. The power device temperature monitor includes a computing device that receives an output of the amplifier, the computing device is configured to derive a temperature of the power device based upon the output of the amplifier.

19 Claims, 7 Drawing Sheets

POWER DEVICE TEMPERATURE MONITOR

BACKGROUND

Electronic devices generate heat during operation. Overheating of electronic devices can cause problems ranging from performance degradation to irreversible damage of the device. Temperature monitoring of electronic devices, particularly semiconductor devices such as power transistors is often desirable, as damage can occur rapidly and with little advance notice. Conventionally, a thermocouple or a thermistor is attached to an electronic device in order to monitor operating temperature of the device. In electrically noisy environments, the output of a thermocouple or a thermistor may be difficult to determine accurately. Also, there is a time delay between a temperature increase of internal regions of an electronic device, such as a semiconductor region or junction, and a corresponding temperature increase of the package or case of the device. Because of this time delay, damage to the semiconductor junction in a power transistor or other semiconductor device can occur before a temperature increase is noticed externally to the device.

It is within this context that the embodiments arise.

SUMMARY

In one embodiment, a power device temperature monitor is provided. The power device temperature monitor includes a power device having a control terminal and an output terminal, where the output terminal is configured to output a current as directed by a voltage of the control terminal. The power device temperature monitor includes an inductor coupled to the output terminal of the power device and an amplifier coupled to the inductor. The power device temperature monitor includes a computing device that receives an output of the amplifier. The computing device is configured to derive a temperature of the power device based upon the output of the amplifier.

In another embodiment, a temperature monitor for power transistors is provided. The temperature monitor includes a plurality of power transistors arranged in parallel, the plurality of power transistors having a control voltage. The temperature monitor includes a plurality of inductors arranged in series, each inductor of the plurality of inductors coupling outputs of neighboring power transistors such that an output current of the plurality of power transistors is routed through the plurality of inductors. The temperature monitor includes an amplifier coupled to at least one of the plurality of inductors and an analog-to-digital converter coupled to an output of the amplifier. The temperature monitor includes a processor in communication with the analog-to-digital converter, the processor configured to execute instructions for computing temperature information relating to the power transistors based upon an analog-to-digital conversion of the output of the amplifier.

In yet another embodiment, a method for monitoring temperature of a power transistor is provided. The method includes measuring a voltage across an inductor coupled to an output of the power transistor, versus time. The method includes deriving a delay time of the power transistor or a switching time of the power transistor, from the measured voltage across the inductor versus time and deriving an estimate of an operating temperature of the power transistor based upon the derived delay time or the derived switching time, wherein at least one method operation is executed through a processor.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
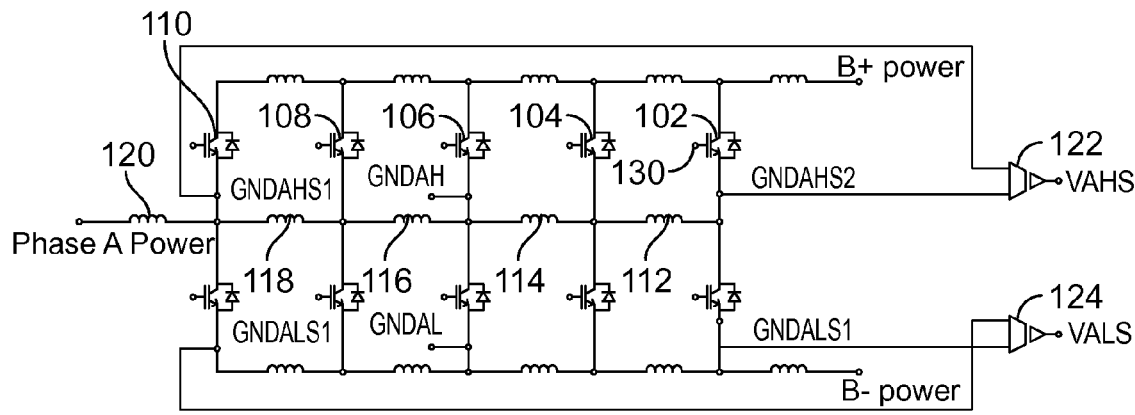
FIG. 1 is a schematic diagram of an apparatus for monitoring temperature of a power transistor by measuring voltage across an inductor.

An apparatus and related method for monitoring temperature of a power transistor make use of an indirect way of doing so. Instead of applying a thermistor, a thermocouple or other conventional temperature sensing agent, the apparatus and method rely on observable changes in operating characteristics of the power transistor. As temperature changes, these operating characteristics change. By measuring response of the power transistor in a circuit, and comparing with previously determined characteristics of the power transistor that are affected by operating temperature, an estimate of the present operating temperature of the power transistor can be made.

As will be further described below, one embodiment of the apparatus has multiple integrated gate bipolar transistors (IGBTs) operating in parallel in an inverter for an electric motor drive. IGBTs are a type of power transistor. A bus bar connects outputs of the power transistors and routes the combined current of the power transistors to one phase of the electric motor. The bus bar has parasitic inductors. When the power transistors switch on or off, these parasitic inductors show a voltage as a result of the product of the inductance and the rate of change in current. A differential amplifier coupled across one or more of the inductors allows this developed voltage to be measured accurately by an analog to digital converter. A processor then analyzes this voltage over time, and derives a turn on delay time, a turn off delay time, a switching on time or rise time, and/or a switching off time or fall time for the power transistor or transistors. The processor compares this derived time value with stored data. The stored data can be characterization data that is available from a manufacturer of the power transistors, or characterization data that is gathered from a test fixture or from the actual apparatus. This data includes operating characteristics of the power transistor taken at multiple temperatures. By comparing the derived time value or values with the previously gathered and stored data, the processor can then form an estimate of the operating temperature of the power transistor or transistors. This estimated operating temperature is thus based on the changes in delay times and switching times caused by temperature changes. The estimated operating temperature is available sooner than if an external temperature sensing device were used, and may provide enough advanced warning to prevent damage to the power transistor.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

FIGS. 1-4 show versions of the apparatus for monitoring temperature of a power transistor. The apparatus of FIGS. 1-4 allows measurement of voltage across parasitic or discrete inductors. This voltage develops or arises from changes in current that occur when the power transistors are turned on and off. FIGS. 5-9 show operating characteristics of a power transistor, specifically an IGBT. These operating characteristics change with temperature. Combining observations of circuit response with operating characteristics allows estimates of the operating temperature of the power transistor or transistors. FIG. 10 shows a flow diagram of a method of estimating operating temperature of a power transistor such as an IGBT, an FET (field effect transistor) or a bipolar transistor. The method can be performed with or by versions of the apparatus of FIGS. 1-4, using temperature-based device characteristics such as shown in FIGS. 5-9.

The apparatus shown in FIG. 1 is used in an inverter to drive a phase of an electric motor, such as for an electric or hybrid automobile or other vehicle. Five IGBTs 102, 104, 106, 108, and 110 are electrically coupled in parallel to form the top switch of the half-bridge inverter. The bottom switch is similarly formed by the other five IGBTs. Each IGBT has a control terminal 130, which is a gate terminal in this embodiment. Each IGBT has a collector (upper terminal in FIG. 1) and an emitter (lower terminal in FIG. 1). Each IGBT turns on and off, passing current and stopping current flow, in response to the gate terminal, as is generally known. The collectors of the IGBTs of the bottom switch are coupled by inductors 112, 114, 116, and 118. The emitters of the IGBTs of the top switch are coupled by the same inductors 112, 114, 116, and 118. Each inductor 112, 114, 116, and 118 couples the collectors of neighboring IGBTs of the bottom switch, and also the emitters of neighboring IGBTs of the top switch. For example, inductor 112 couples emitters of neighboring IGBTs 102 and 104. The inductors 112, 114, 116, and 118 are parasitic inductors of a bus bar that couples the emitters of respective IGBTs 102, 104, 106, 108, and 110 in some embodiments. In further embodiments, the inductors could be discrete devices or a combination of parasitic inductances and discrete inductors.

An isolation differential amplifier 122 is coupled across the inductors 112, 114, 116, and 118. The isolation differential amplifier 122 isolates the inputs of the amplifier from the output of the amplifier, which may be useful in high-voltage circuits or in distributed systems with sensing and processing occurring in different locations. Generally, a differential amplifier rejects common mode noise, which may be useful in electrically noisy environments, such as the environment of an electric vehicle. In further embodiments, other types of differential amplifiers or other types of amplifiers can be used. For example, single ended amplifiers could be coupled at opposed ends of one of the inductors or opposed ends of a group of inductors. A processor could subtract analog-to-digital converted voltages from the single ended amplifiers and derive a voltage across an inductor in this embodiment.

The isolation differential amplifier 122 has as input the voltage across the inductors 112, 114, 116, and 118. In further embodiments, a differential amplifier could be coupled across a single inductor, or across two inductors or more than two inductors. The isolation differential amplifier 122 measures, or allows measurement to be made of, the voltage that develops across the inductors when the current through the inductors changes. This developed voltage is in accordance with the well-known equation V=L di/dt. In other words, when the IGBTs turn on and current surges through these power transistors, this same current surges through the inductors. This current is delivered from the B+ power terminal, via the IGBTs 102, 104, 106, 108, and 110 as the positive direction of the phase A power. This change in current is observed as a voltage change across the inductors. When the IGBTs turn off and current suddenly decreases through the power transistors, this same current decrease occurs through the inductors. This change in current is also observed as a voltage change across the inductors. A similar isolation differential amplifier 124 measures, or allows measurement to be made of, the voltage that develops across inductors that couple a further set of IGBTs, and more specifically the emitters of the lower switch of the half-bridge circuit. This further set of IGBTs is responsible for the negative direction of current flow of the phase A power. The negative direction of current flow of the phase A power is delivered from the B-power terminal and the details are not provided for the sake of brevity as the description is similar to that described above for the positive direction of current flow.

Figure 2:
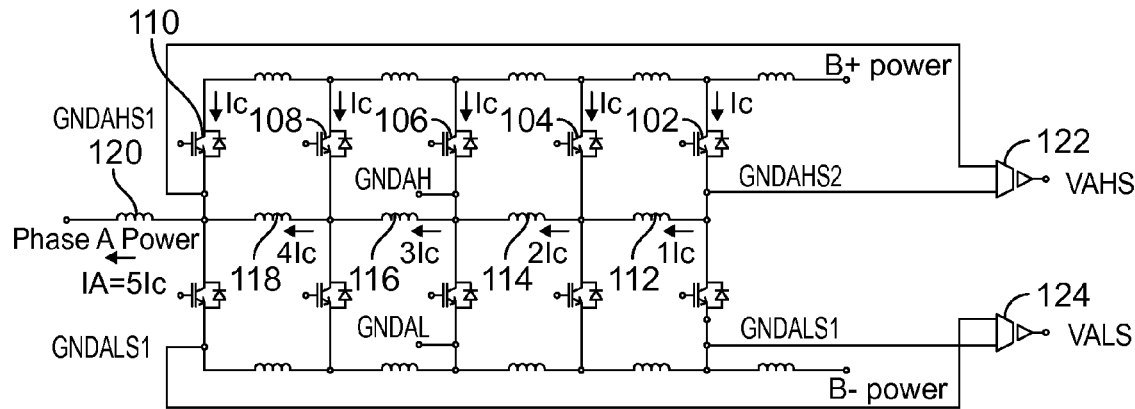
FIG. 2 is a schematic diagram of the apparatus of FIG. 1, showing distribution of electrical current through power devices and inductors.

FIG. 2 shows current flows when the IGBTs 102, 104, 106, 108, and 110 are turned on. Each IGBT flows a current Ic, so that the total amount of current delivered to the phase A power terminal is IA=5 Ic. With the connections shown, the currents are additive as current from each IGBT joins current provided by previous IGBTs. Thus, a first inductor 112 has a single multiple of current Ic flowing through the inductor. A second inductor 114 has twice as much or 2 Ic flowing through the inductor. A third inductor 116 has three times as much or 3 Ic flowing through the inductor. A fourth inductor 118 has four times as much or 4 Ic flowing through the inductor. Finally, a fifth inductor 120 has five times as much or 5 Ic flowing through the inductor. In alternative embodiments with different connections, current flows will change accordingly. It should be appreciated that the voltage that develops across a specified inductor or group of inductors will be in accordance with the current flowing through the inductor or group of inductors. More specifically, the voltage across a specified inductor or group of inductors will be proportional to the change in current flowing through the inductor or group of inductors.

Figure 3:
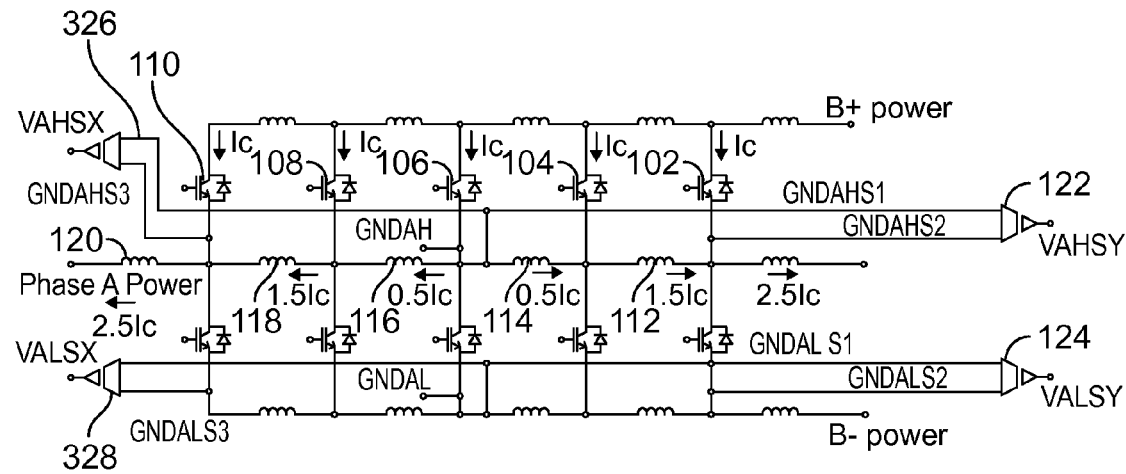
FIG. 3 is a schematic diagram of a variation of the apparatus of FIG. 1, showing additional amplifiers and a different routing of electrical current.

FIG. 3 shows one such embodiment with different connections, as a variation of the apparatus of FIGS. 1 and 2. In FIG. 3, there are two terminals for phase A power. These two terminals are at opposed ends of a bus bar (shaded rectangle) that couples the emitters of the IGBTs 102, 104, 106, 108, and 110. This bus bar includes, as parasitic inductors, the inductors 112, 114, 116, and 118. The two terminals for phase A power are externally coupled to each other and to a load such as an electric motor. Because of this geometry, the electrical currents have a different routing than that shown in FIG. 2. In FIG. 3, the current Ic traveling through the middle IGBT 106 generally splits in opposed directions. Accordingly, one of the inductors 114 has half of this current or 0.5 Ic. Inductor 116 has half of the current or 0.5 Ic, in the opposed direction. Moving to the right, IGBT 104 has current Ic which joins the half current 0.5 Ic, so that 1.5 Ic flows through an inductor 112. Similarly, 1.5 Ic flows through an inductor 118. At each end of the apparatus, one more current Ic joins so that the right-side phase A power delivers 2.5 Ic and the left-side phase A power also delivers 2.5 Ic. Total power delivered by phase A power is still 5 Ic. It should be appreciated that this embodiment reduces parasitic losses of voltage. Four isolation differential amplifiers 122, 124, 326 and, 328 are coupled to the inductors. Each isolation differential amplifier is coupled across two of the inductors in this embodiment. Accordingly, the voltage that each isolation differential amplifier sees in FIG. 3 is lower than the voltage that each differential amplifier sees in FIGS. 1 and 2. This trade-off is compensated for by having the additional differential amplifiers, so that there is a finer resolution of device monitoring, i.e., a rise in temperature can be pinpointed to a smaller group of power transistors.

Figure 4:
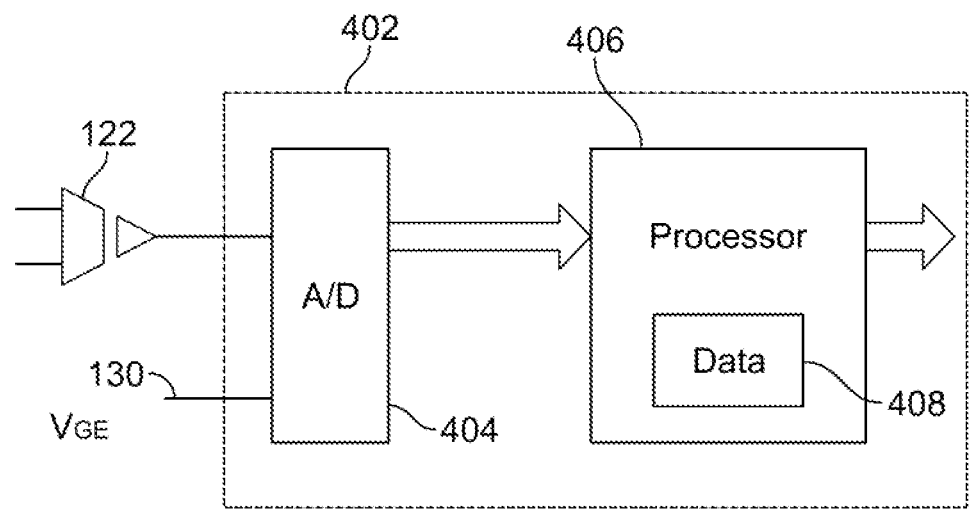
FIG. 4 is a schematic diagram of a device that produces an estimate of the operating temperature of a power transistor, based upon output of an amplifier from FIG. 1.

As shown in FIG. 4, the output of the isolation differential amplifier 122 is coupled to a device 402 that produces an estimate of the operating temperature of the power transistors. The device 402 includes an analog-to-digital converter 404 and a processor 406. The analog-to-digital converter 404 converts the output of the isolation differential amplifier 122 to a digital value, which can then be analyzed by the processor 406. For example, the processor 406 can calculate rise times, fall times, turn on switching times and turn off switching times from a time sequence of the measured voltage across the inductors. In some versions, the analog-to-digital converter 404 also converts the control voltage 130, in this case the voltage from gate to emitter Vge of the power devices, so that the control voltage 130 can be analyzed by the processor 406. For example, the processor 406 can calculate turn on delay and turn off delay by comparing a time sequence of the measured voltage across the inductors with a time sequence of the measured control voltage 130.

The processor 406 has access to data 408, which could include characterization data in the form of a lookup table or other format. The processor 406 derives one or more parameter values from the analog-to-digital conversion of the output of the isolation differential amplifier 122, i.e., the voltage across the inductors. In some versions, the processor 406 derives one or more parameter values from the converted voltage across the inductors and from the analog-to-digital conversion of the control voltage 130. The processor then compares the derived one or more parameter values to the data 408, and derives an estimate of the operating temperature of the power devices.

The data 408 is stored prior to measuring the voltage across the inductor. For example, the data 408 could be based on published data sheets for power transistors. The data 408 could be purchased from the manufacturer of a power transistor. The data 408 could be gathered as characterization data in a test environment or lab environment. The data 408 could be gathered as characterization data from the actual circuit board or other physical implementation of a power driver apparatus. The data 408 could be stored in a read-only memory (ROM), downloaded into a random-access memory (RAM), or modified during operation of the apparatus, e.g., as components age or are replaced. The data 408 could be in the form of data points, curves, equations, interpolations or extrapolations, etc., and the data could be in known or arbitrary units, or normalized or otherwise modified. It should be appreciated that both the device 402 and the form of the data 408 could be implemented in different forms. The device 402 could be in hardware, firmware, software, or could even be implemented with linear circuits that emulate or simulate device behavior or perform analog integration. In embodiments where device 402 includes a processor, the memory could be internal to the processor or external to the processor or external to the apparatus.

Figure 5:
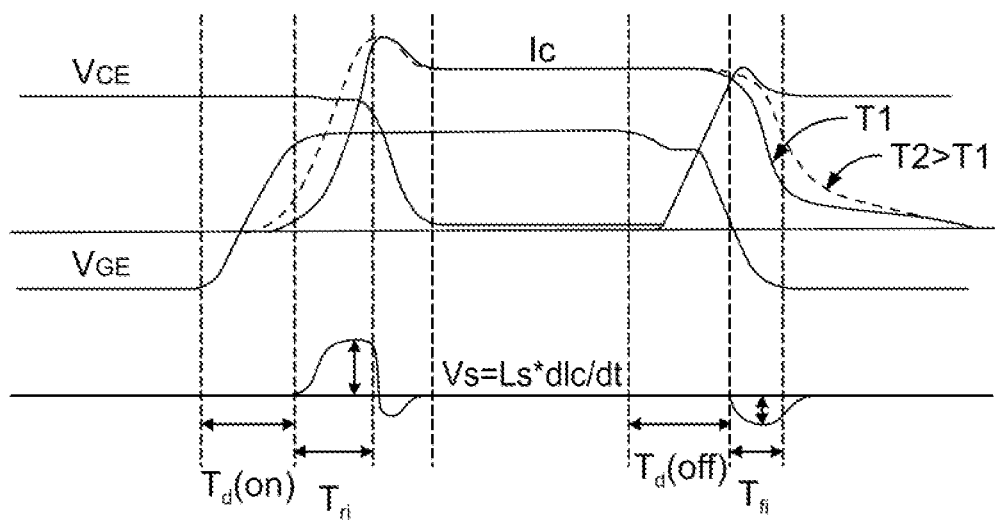
FIG. 5 is a plot of voltage and current of a power transistor versus time, as measured in the apparatus of FIG. 1.

Examples of suitable types of data for the device 402 of FIG. 4 or the method of FIG. 10 are shown in FIGS. 5-9. FIG. 5 shows voltages and currents as waveforms for an IGBT that is turning on and off, as a function of time. Curves are shown for two different temperatures, T1 and T2. Shortly after the gate to emitter voltage Vge rises, the current Ic rises and the collector to emitter voltage Vice falls. This is the turn on of the power device. A turn on delay Td(on) is observed from the start of the rise of the gate to emitter voltage Vge to the start of the rise of the current Ic. The start of the rise of the current Ic is also marked by the start of the positive voltage pulse that develops across the inductor (lower-most trace in FIG. 5). The total width of this positive voltage pulse is equal to the rise time Tri of the current Ic, at the lower temperature T1. The waveform of the current Ic can be derived by integrating the waveform of the voltage that develops across the inductor. From this integral, the peak value of the current Ic, or a value proportional to the peak value of the current Ic, can be derived. Shortly after the gate to emitter voltage Vge falls, the current Ic falls and the collector to emitter voltage Vice rises. This is the turn off of the power device. A turn off delay Td(off) is observed from the start of the fall of the gate to emitter voltage Vge to the start of the fall of the current Ic. The start of the fall of the current Ic is also marked by the start of the negative voltage pulse that develops across the inductor (lower-most trace in FIG. 5). The total width of this negative voltage pulse is equal to the fall time Tfi of the current Ic, at the lower temperature T1. Similar calculations can be made at the higher temperature T2.

Figure 6:
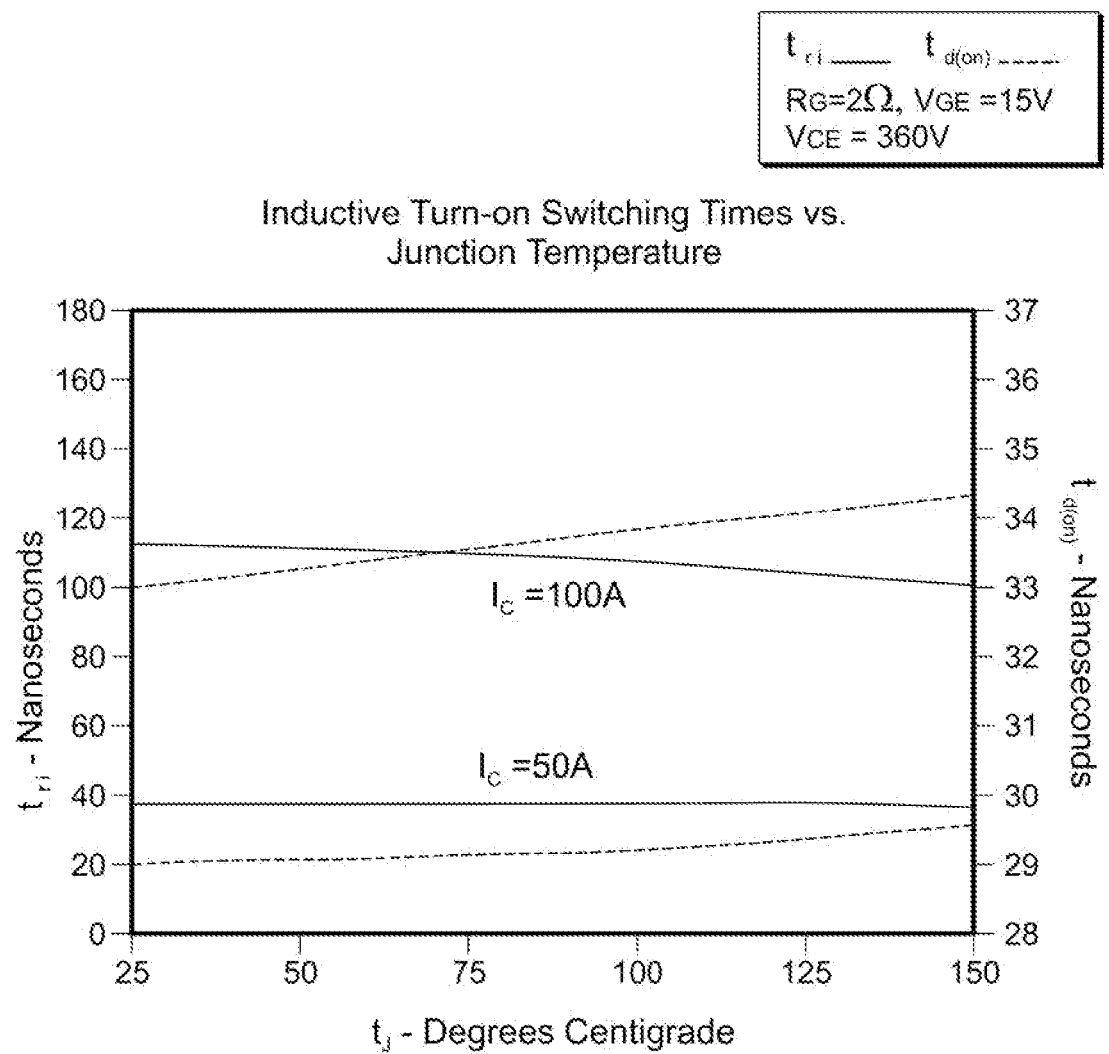
FIG. 6 is a graph of inductive turn-on switching times versus junction temperature at two different currents, for the power transistor.
Figure 7:
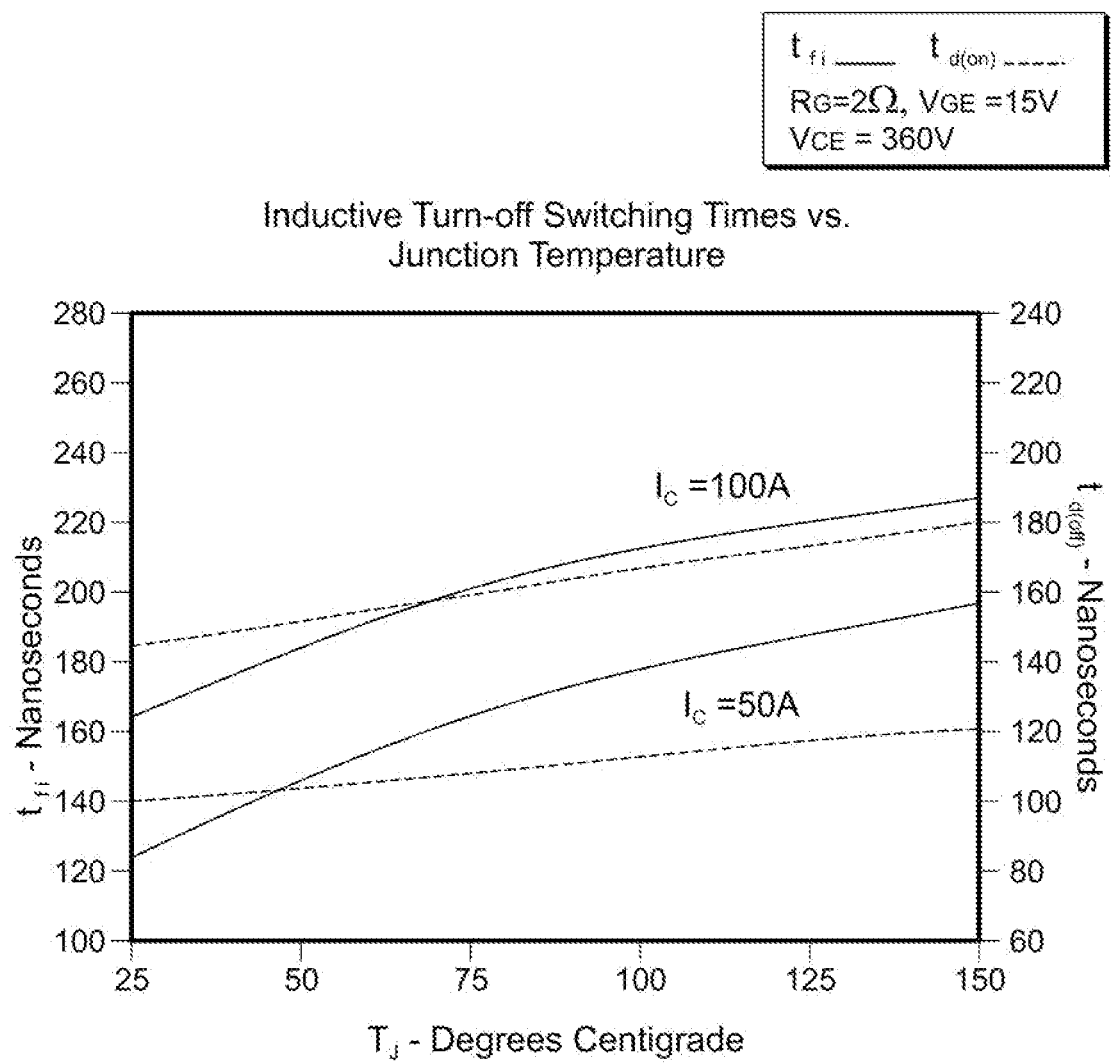
FIG. 7 is a graph of inductive turn-off switching times versus junction temperature at two different currents, for the power transistor.
Figure 8:
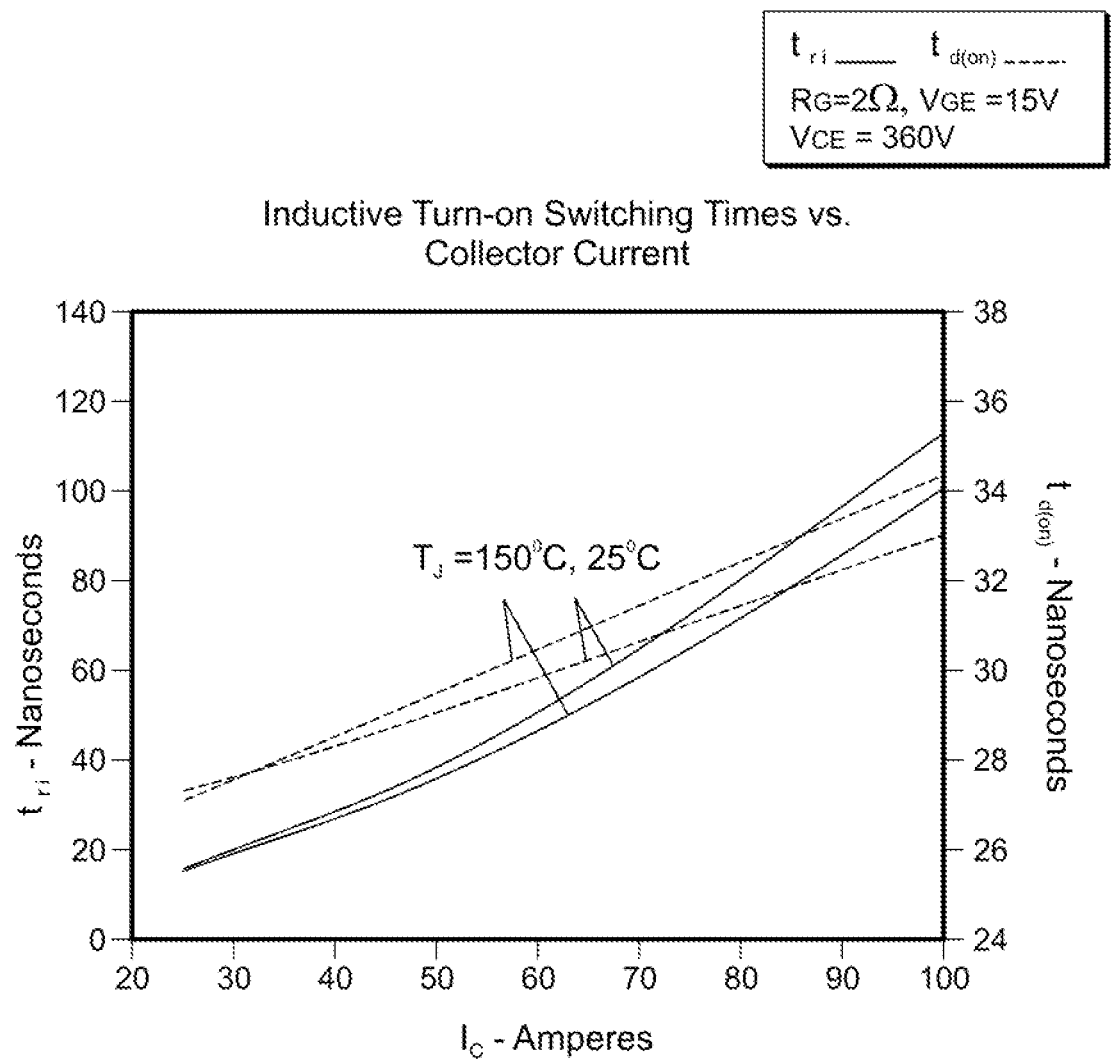
FIG. 8 is a graph of inductive turn-on switching times versus collector current at two different temperatures, for the power transistor.
Figure 9:
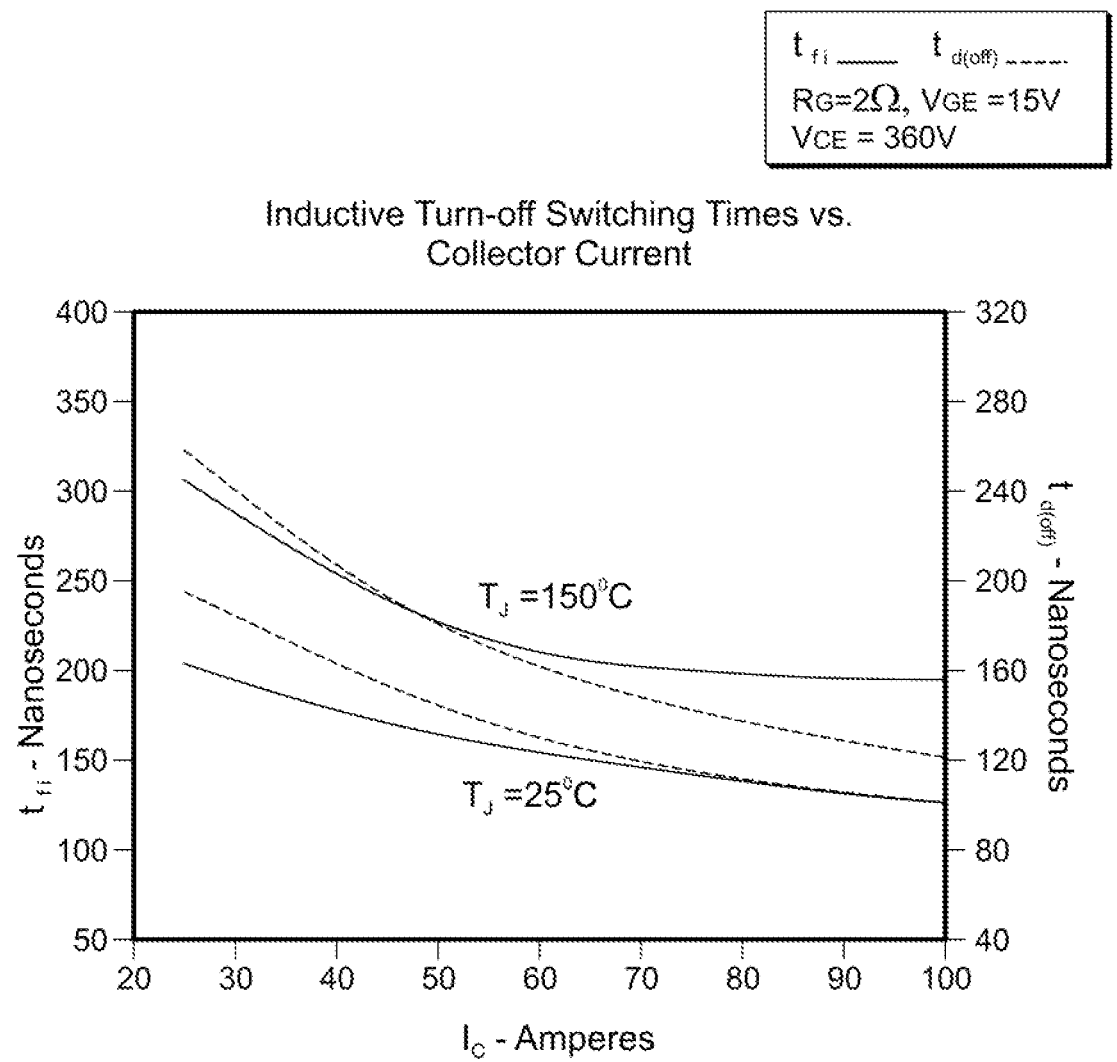
FIG. 9 is a graph of inductive turn-off switching times versus collector current at two different temperatures, for the power transistor.
Figure 10:
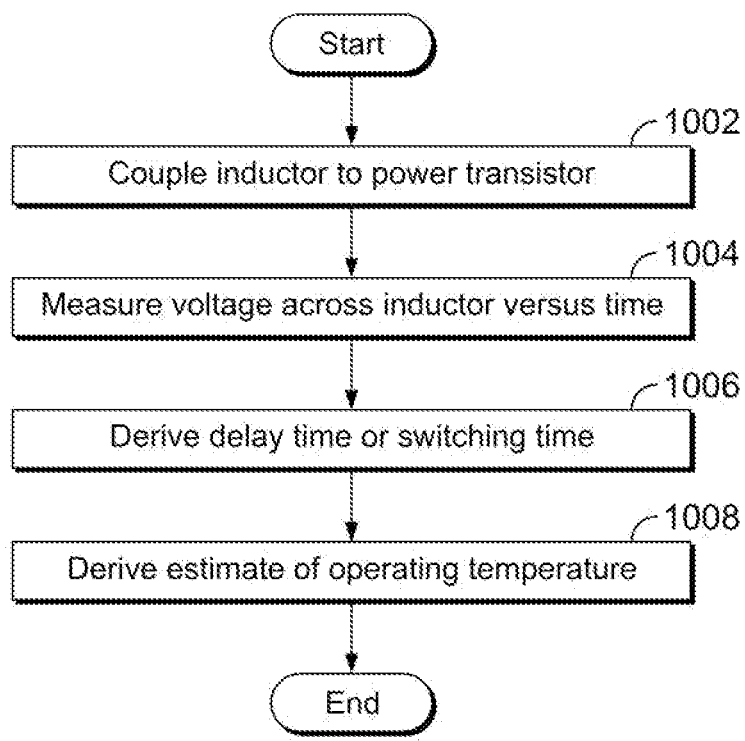
FIG. 10 is a flow diagram of a method of estimating operating temperature of a power transistor.

FIGS. 6-9 show examples of characterization data in graphical form. In FIG. 6, the rise time tri and the turn on delay time td(on) are shown for two different values of current Ic, as a function of temperature. In FIG. 7, the fall time tfi and the turn off delay time td(off) are shown for two different values of current Ic, as a function of temperature. In FIG. 8, the rise time tri and the turn on delay time td(on) are shown for two different values of temperature, as a function of current Ic. In FIG. 9, the fall time tfi and the turn off delay time td(off) are shown for two different values of temperature, as a function of current Ic. It should be appreciated that this data is specific to a specific device, and data for other devices may differ. Thus, FIGS. 6-9 are examples and not meant to be limiting. The rise time tri of the current Ic may be equated to or is closely related to the turn on switching time in some embodiments. The fall time tfi of the current Ic may be equated to or is closely related to the turn off switching time in some embodiments.

Data such as shown in FIGS. 5-9 can be applied to making temperature estimates from measured device performance parameters. For a specified power device, one set of curves may be preferred over another set. This may guide design choices as to which parameter or parameters to measure in an apparatus, and which data to store for use in deriving the estimate of the operating temperature of the power transistor. For example, a curve that is relatively flat with regard to temperature or which intersects a specified temperature more than once may be difficult to use or yield ambiguous results of temperature estimates in an apparatus. A curve that is monotonically rising at a readily discernible rate with respect to temperature may yield estimates of temperature that are more accurate than those obtainable with use of the previously discussed curve. For example, applying the data of FIG. 7 to an observed operating current of 50 A and a fall time tfi of 160 ns yields an estimated temperature of about 67° C.

FIG. 10 shows a method of estimating operating temperature of a power transistor. An inductor is coupled to a power transistor, in an action 1002. In one embodiment, this action is realized in the form of a printed circuit board (PCB) with one or more power transistors. The power transistors are coupled by parasitic inductors in the form of a bus bar. The apparatuses of FIGS. 1-4 can be used to accomplish the action 1002. Voltage across the inductor is measured versus time, in an action 1004. This can be accomplished by using the isolation differential amplifier of FIG. 1, the analog-to-digital converter and the processor of FIG. 4. These components can rapidly sample and record a sequence of voltages across one or more of the inductors of FIGS. 1-3. A delay time or a switching time is derived, in an action 1006. The processor of FIG. 4 can perform this action, using the sampled and recorded sequence of voltages. Where a switching time is derived, this can be based upon the sequence of voltages across one or more of the inductors of FIGS. 1-3. Where a delay time is derived, this can be based upon both the sequence of voltages across one or more of the inductors, and a sequence of voltages of the control voltage of FIG. 1. These voltages can be analog-to-digital conversions, via the analog-to-digital converter, coupled as shown in FIG. 4. Integration can be used to derive values of the current Ic, or values proportional to the current Ic, from values of the voltage developed across the inductor or inductors. Alternatively, a current sensor could supply a peak value of the current Ic. An estimate of the operating temperature of the power transistor or transistors is derived, in an action 1008. This estimate can be based on the derived delay time or switching time, and the stored data. For example, the processor can access the data as shown in FIG. 4. The processor can compare the derived delay time or switching time with the stored data, and derive the estimate of the operating temperature of the power transistor or transistors. The processor could generate a temperature trend or a warning regarding a temperature, in addition to or instead of the estimated temperature.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The embodiments can also be embodied as computer readable code on a computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including handheld devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A power device temperature monitor, comprising:
a power device having a control terminal and an output terminal, the output terminal configured to output a current as directed by a voltage of the control terminal;
an inductor coupled to the output terminal of the power device;
an amplifier coupled to the inductor; and
a computing device that receives an output of the amplifier, the computing device configured to derive a temperature of the power device based upon the output of the amplifier wherein the derivation of the temperature involves a comparison of a value associated with a voltage drop across the inductor with characterization data accessed by the computing device.

2. The power device temperature monitor of claim 1, wherein the power device comprises one or more integrated gate bipolar transistors or field effect transistors.

3. The power device temperature monitor of claim 1, wherein the inductor comprises one or more parasitic inductors.

4. The power device temperature monitor of claim 1, wherein the amplifier comprises an isolation differential amplifier.

5. The power device temperature monitor of claim 1, wherein the computing device comprises:
an analog-to-digital converter coupled to the amplifier;
data relating at least one operating parameter of the power device to temperature; and
a processor coupled to the analog-to-digital converter, the processor having access to the data.

6. The power device temperature monitor of claim 1, wherein the computing device receives the voltage of the control terminal of the power device, and wherein the derived temperature of the power device is further based upon the voltage of the control terminal of the power device.

7. A temperature monitor for power transistors, comprising:
a plurality of power transistors arranged in parallel, the plurality of power transistors having a control voltage;
a plurality of inductors arranged in series, each inductor of the plurality of inductors coupling outputs of neighboring power transistors such that an output current of the plurality of power transistors is routed through the plurality of inductors;
an amplifier coupled to at least one of the plurality of inductors;
an analog-to-digital converter coupled to an output of the amplifier; and
a processor in communication with the analog-to-digital converter, the processor configured to execute instructions for computing temperature information relating to the power transistors based upon an analog-to-digital conversion of the output of the amplifier.

8. The temperature monitor for power transistors of claim 7, comprising:
a bus bar coupled to the outputs of the plurality of power transistors, the bus bar including the plurality of inductors and wherein the amplifier is a differential amplifier.

9. The temperature monitor for power transistors of claim 7, wherein the analog-to-digital converter is coupled to the control voltage and wherein the temperature information is further based upon an analog-to-digital conversion of the control voltage.

10. The temperature monitor for power transistors of claim 7, wherein the processor has access to data that includes a turn on delay, or a turn off delay, of a power transistor at two or more temperatures.

11. The temperature monitor for power transistors of claim 7, wherein the processor has access to data that includes a turn on switching duration, or a turn off switching duration, of a power transistor at two or more temperatures.

12. The temperature monitor for power transistors of claim 7, wherein the temperature information relating to the power transistors includes one from a set consisting of: an estimated temperature, a temperature trend, and a warning regarding a temperature.

13. The temperature monitor for power transistors of claim 7, further comprising:
a current sensor arranged so that the output current of at least one of the plurality of power transistors is routed through the current sensor, the current sensor in communication with the processor, wherein the temperature information is further based upon a measurement from the current sensor.

14. The temperature monitor for power transistors of claim 7, further comprising:
a further amplifier coupled to a differing at least one of the plurality of inductors, wherein an output of the further amplifier is coupled to the analog-to-digital converter.

15. A method for monitoring temperature of a power transistor, the method comprising:
measuring a voltage across an inductor coupled to an output of the power transistor, versus time;
deriving a delay time of the power transistor or a switching time of the power transistor, from the measured voltage across the inductor versus time; and
deriving an estimate of an operating temperature of the power transistor based upon the derived delay time or the derived switching time, wherein at least one method operation is executed through a processor and wherein the deriving of the estimate involves a comparison of a value associated with the measured voltage across the inductor with characterization data accessed by the processor.

16. The method of claim 15, wherein the power transistor includes an integrated gate bipolar transistor or a field effect transistor.

17. The method of claim 15, wherein deriving the switching time of the power transistor includes integrating the measured voltage across the inductor versus time.

18. The method of claim 15, further comprising:
measuring a voltage of a control of the power transistor versus time, wherein deriving the delay time of the power transistor includes comparing the voltage across the inductor versus time to the voltage of the control of the power transistor versus time.

19. The method of claim 15, further comprising:
storing data prior to measuring the voltage across the inductor, the data relating operating temperature of a power transistor to delay times of the power transistor or to switching times of the power transistor, wherein the deriving the estimate of the operating temperature of the power transistor is further based upon the data stored prior to measuring the voltage across the inductor, wherein the derived delay time includes a turn on delay time, a turn off delay time, or a combined turn on and turn off delay time, and wherein the derived switching time includes a turn on switching time, a turn off switching time, or a combined turn on and turn off delay time.

* * * * *